United States Patent
Miwa et al.

(10) Patent No.: US 9,287,721 B2
(45) Date of Patent: Mar. 15, 2016

(54) CHARGER, ADAPTER AND CHARGING SYSTEM

(75) Inventors: Tatsuya Miwa, Mie (JP); Masaki Ikeda, Mie (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 554 days.

(21) Appl. No.: 13/885,529

(22) PCT Filed: Dec. 5, 2011

(86) PCT No.: PCT/JP2011/078080
§ 371 (c)(1),
(2), (4) Date: May 15, 2013

(87) PCT Pub. No.: WO2012/077637
PCT Pub. Date: Jun. 14, 2012

(65) Prior Publication Data
US 2013/0234655 A1  Sep. 12, 2013

(30) Foreign Application Priority Data
Dec. 6, 2010 (JP) ................. 2010-271763

(51) Int. Cl.
*H02J 7/00* (2006.01)
*H02J 7/04* (2006.01)

(52) U.S. Cl.
CPC ............ *H02J 7/0003* (2013.01); *H02J 7/0004* (2013.01); *H02J 7/0006* (2013.01); *H02J 7/041* (2013.01); *H02J 2007/0001* (2013.01)

(58) Field of Classification Search
CPC ...... Y02E 60/12; H02J 7/0004; H02J 7/0006; H02J 7/0042; H02J 7/0045; H01M 10/48; H01M 10/4257; H01M 10/44; H01M 10/46; H01M 2/1055; H01M 10/425
USPC ......................... 320/106, 107, 112
See application file for complete search history.

(56) References Cited

U.S. PATENT DOCUMENTS

| | | | | |
|---|---|---|---|---|
| 5,717,307 A | * | 2/1998 | Barkat | H01M 10/44 307/125 |
| 2001/0017531 A1 | | 8/2001 | Sakakibara et al. | |
| 2005/0174094 A1 | * | 8/2005 | Purdy | H02J 7/0052 320/134 |

FOREIGN PATENT DOCUMENTS

| | | |
|---|---|---|
| JP | 01-319270 A | 12/1989 |
| JP | 2000-324706 A | 11/2000 |

(Continued)

OTHER PUBLICATIONS

International Search Report for corresponding International Application No. PCT/JP2011/078080 mailed Mar. 13, 2012.

(Continued)

*Primary Examiner* — Richard Isla Rodas
*Assistant Examiner* — Mohammed J Sharief
(74) *Attorney, Agent, or Firm* — Renner, Otto, Boisselle & Sklar, LLP

(57) ABSTRACT

The charger includes: a connector to be connected to a battery; an identification unit configured to perform an identification process of judging whether the battery being connected to the connector is a compliant battery allowed to be directly connected to the connector or a non-compliant battery allowed to be indirectly connected to the connector, and output a result of the identification process; a main charging unit configured to charge the compliant battery according to a main charging condition appropriate to the compliant battery; an auxiliary charging unit configured to charge the non-compliant battery according to an auxiliary charging condition which does not cause a harmful effect on the non-compliant battery; and a control unit configured to receive the result from the identification unit, and, when the result indicates the compliant battery, activate the main charging unit, and, when the result indicates the non-compliant battery, activate the auxiliary charging unit.

9 Claims, 8 Drawing Sheets

(56) References Cited

FOREIGN PATENT DOCUMENTS

| | | | |
|---|---|---|---|
| JP | 2001-238362 | A | 8/2001 |
| JP | 2004-289897 | A | 10/2004 |
| JP | 2006-094608 | A | 4/2006 |

OTHER PUBLICATIONS

Form PCT/ISA/237 for corresponding International Application No. PCT/JP2011/078080 dated Mar. 13, 2012.

* cited by examiner

CHARGER, ADAPTER AND CHARGING SYSTEM

TECHNICAL FIELD

The present invention relates to chargers, adapters, and charging systems including the chargers and the adapters.

BACKGROUND ART

Secondary batteries are used as power sources for electrically-powered equipment, and are built in battery packs, for example. These secondary batteries are charged (recharged) by use of chargers (rechargers). Various kinds of such secondary batteries have been proposed by plural manufacturers.

As disclosed in document 1 (JP 1-319270 A) and document 2 (JP 2004-289897 A), there have been proposed preparing plural adapters respectively corresponding to secondary batteries (battery packs) and connecting one selected from the secondary batteries of the plural types to a common charger by use of a corresponding one of the plural adapters.

With regard to the secondary batteries, charging methods appropriate to the respective secondary batteries are different according to manufacturers thereof and/or their types. For example, the charging method mainly defines a charging current value used in constant current charging (hereinafter, referred to as "CC charging") and a charging voltage value used in constant voltage charging (hereinafter, referred to as "CV charging"), and there are some charging methods peculiar to respective manufacturers. Note that, in a general process of charging the secondary battery, the CC charging with the predetermined charging current value is performed at first, and when the secondary battery is charged up to about 80%, the CC charging is terminated and subsequently the CV charging with the predetermined charging voltage value is performed.

According to the prior charger mentioned above, it is possible to charge (recharge) the secondary batteries of the plural types by use of the common charger and the corresponding adapter interposed between the secondary battery and the common charger. However, in this case, the charging method is likely to be inappropriate to the secondary battery to be charged (i.e., the CC charging and the CV charging are not performed under appropriate conditions). Not performing the charging under an appropriate condition may cause a harmful effect on the life of the secondary battery and the safety of the charging.

SUMMARY OF INVENTION

In view of the above insufficiency, the present invention has aimed to propose a charger, an adapter, and a charging system which are capable of facilitating charging each of the secondary batteries of the different types by use of a charging method appropriate thereto.

The first aspect of the charger in accordance with the present invention includes: a connector adapted in use to be connected to a battery; an identification unit configured to perform an identification process of judging whether the battery being connected to the connector is a compliant battery allowed to be directly connected to the connector or a non-compliant battery allowed to be indirectly connected to the connector, and output a result of the identification process; a main charging unit configured to charge the compliant battery in conformity with a main charging condition appropriate to the compliant battery; an auxiliary charging unit configured to charge the non-compliant battery in conformity with an auxiliary charging condition which does not cause a harmful effect on the non-compliant battery; and a control unit configured to receive the result from the identification unit, and, when the result indicates the compliant battery, activate the main charging unit, and, when the result indicates the non-compliant battery, activate the auxiliary charging unit.

As for the second aspect of the charger in accordance with the present invention, in addition to the first aspect, the charger further includes a storage unit. The storage unit is configured to store a plurality of the auxiliary charging conditions. The plurality of the auxiliary charging conditions includes plural specified battery charging conditions respectively corresponding to plural specified batteries classified into the non-compliant battery and an unspecified battery charging condition. The identification unit is configured to, in the identification process, upon concluding that the battery being connected to the connector is the non-compliant battery, further judge whether the battery is any one of the plural specified batteries or an unspecified battery different from the plural specified batteries. The control unit is configured to: when the result indicates the specified battery, retrieve the specified battery charging condition corresponding to the specified battery indicated by the result from the storage unit and control the auxiliary charging unit in conformity with the retrieved specified battery charging condition; and when the result indicates the unspecified battery, retrieve the unspecified battery charging condition from the storage unit and control the auxiliary charging unit in conformity with the retrieved unspecified battery charging condition.

As for the third aspect of the charger in accordance with the present invention, in addition to the second aspect, the auxiliary charging unit is configured to charge the non-compliant battery by supplying a constant current to the non-compliant battery. The auxiliary charging condition indicates a value of the constant current. The value of the constant current indicated by the unspecified battery charging condition is not greater than a minimum of the values of the constant currents indicated by the respective plural specified battery charging conditions.

As for the fourth aspect of the charger in accordance with the present invention, in addition to the second or third aspect, the auxiliary charging unit is configured to charge the non-compliant battery by applying a constant voltage to the non-compliant battery. The auxiliary charging condition indicates a value of the constant voltage. The value of the constant voltage indicated by the unspecified battery charging condition is not greater than a minimum of the values of the constant voltages indicated by the respective plural specified battery charging conditions.

As for the fifth aspect of the charger in accordance with the present invention, in addition to any one of the second to fourth aspects, the charger comprises a voltage acquisition unit configured to acquire a value of a voltage of the battery being connected to the connector. The control unit is configured to judge whether or not the value of the voltage acquired by the voltage acquisition unit is not less than a predetermined threshold, and, upon concluding that the value of the voltage acquired by the voltage acquisition unit is not less than the predetermined threshold, terminate an operation of the auxiliary charging unit. The auxiliary charging condition indicates the predetermined threshold.

As for the sixth aspect of the charger in accordance with the present invention, in addition to any one of the first to fifth aspects, the identification unit includes: an acquisition circuit configured to acquire type information representing a type of the battery in response to connection of the battery to the connector; and an identification circuit configured to perform the identification process based on the type information acquired by the acquisition circuit.

As for the seventh aspect of the charger in accordance with the present invention, in addition to the sixth aspect, the connector includes two identification terminals for identifying the type of the battery. The acquisition circuit is configured to measure a resistance between the two identification terminals. The type information is defined as the resistance between the two identification terminals.

As for the eighth aspect of the charger in accordance with the present invention, in addition to the sixth aspect, the connector includes a single identification terminal for identifying the type of the battery. The acquisition circuit is configured to receive an identification signal indicative of the type information via the identification terminal.

One aspect of the adapter in accordance with the present invention includes: a first connector configured to allow the connector of the charger according to any one of the first to eighth aspects to be directly connected thereto; a second connector configured to allow the non-compliant battery to be directly connected thereto; a connection circuit interposed between the first connector and the second connector and configured to electrically connect the first connector and the second connector to each other; and an identification unit having information indicative of the non-compliant battery allowed to be directly connected to the second connector.

One aspect of the charging system in accordance with the present invention includes: the charger according to any one of the first to eighth aspects; and an adapter. The adapter includes: a first connector configured to allow the connector of the charger to be directly connected thereto; a second connector configured to allow the non-compliant battery to be directly connected thereto; a connection circuit interposed between the first connector and the second connector and electrically connecting the first connector and the second connector to each other; and an identification unit having information indicative of the non-compliant battery allowed to be directly connected to the second connector.

DESCRIPTION OF EMBODIMENTS

First Embodiment

Figure 1:
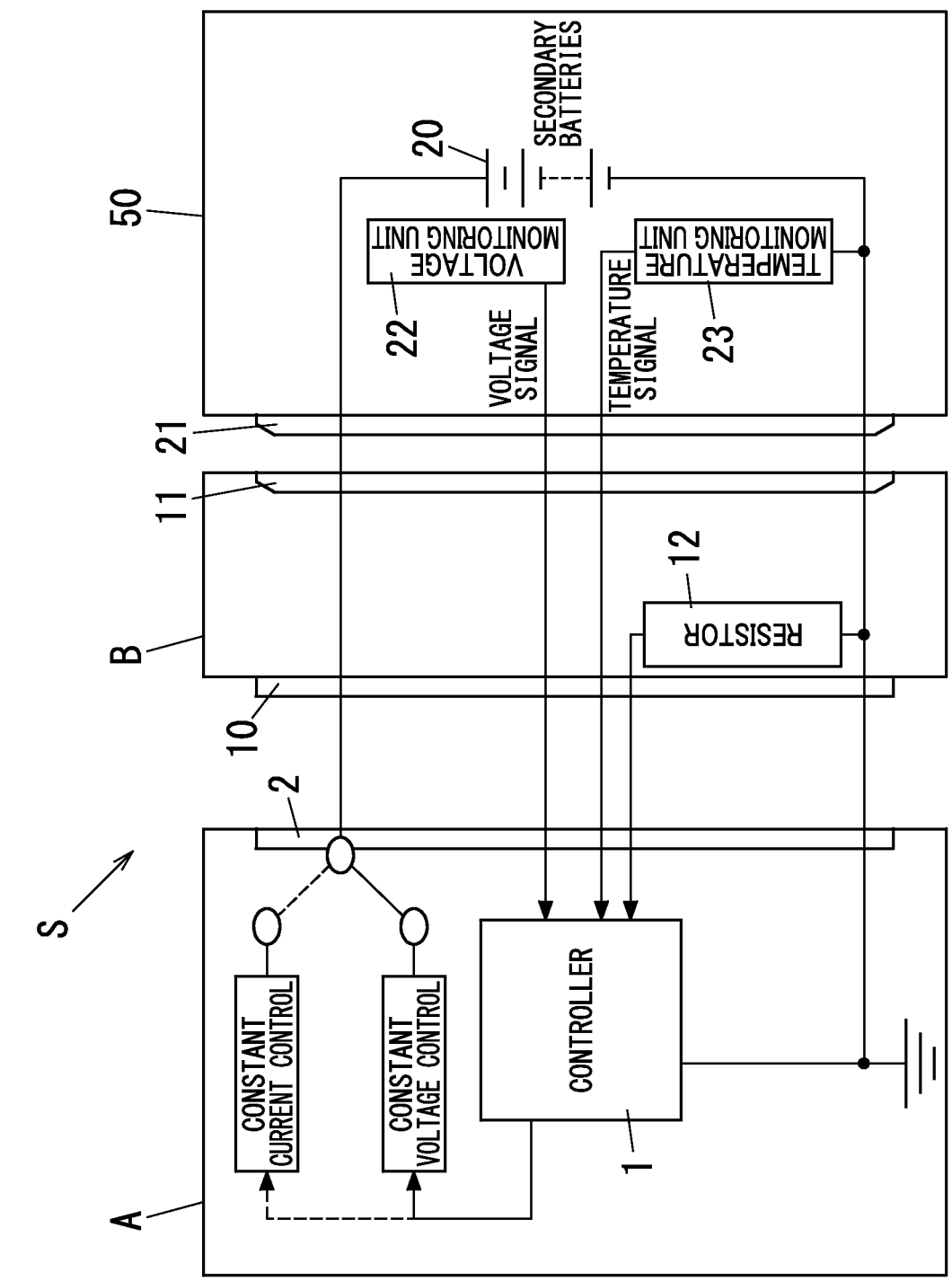
FIG. 1 is a schematic block diagram illustrating a charging system of the first embodiment.

FIG. 1 shows the charging system "S" of the present embodiment in accordance with the present invention. This charging system "S" is designed to enable a user to charge up desired one of secondary batteries 20 of plural types, and is constituted by an charger (recharger) "A" and an adapter "B".

The charger "A" is used in common to each type of the secondary batteries 20. In contrast, the adapters "B" of plural types are used for the respective corresponding types of the secondary batteries 20. In brief, the charging system "S" of the present embodiment includes the single charger "A" used in common to the secondary batteries 20 of the plural types and the adapters "B" of the plural types selectively connected to this charger "A".

The charger "A" incorporates therein a controller 1 constituted by a charging control microcomputer. The controller 1 charges (recharges) the secondary battery 20 inside a battery pack 50 connected via the adapter "B", in conformity with a prescribed charging program. Further, the charger "A" is provided with an attaching part 2 adapted in use to be attached to one of the adapters "B" of the plural types.

The adapter "B" is provided with an attached part 10 which has a shape and a size corresponding to those of the attaching part 2 of the charger "A". In the present embodiment, the attaching part 2 has a recessed shape and the attached part 10 has a protruded shape, and the charger "A" and the adapter "B" are connected mechanically and electrically by fitting the attached part 10 into the attaching part 2. However, another connection structure can be used so long as the charger "A" and the adapter "B" are connected mechanically and electrically. Further, the adapter "B" is provided with a connecting part 11 for making connection with the battery pack 50. The connecting part 11 is located at an opposite side of the adapter "B" from the attached part 10. The connecting part 11 has a shape and a size dedicated to the battery pack 50 allowed to be connected to the adapter "B".

Additionally, the adapter "B" incorporates therein a resistor 12 having a predetermined electric resistance. When the adapter "B" is connected to the charger "A", the resistor 12 is connected to the controller 1 inside the charger "A". The predetermined electric resistance defines an adapter identification signal outputted to the controller 1.

The battery pack 50 includes a connected part 21 which has a shape and a size corresponding to the connecting part 11 of the adapter "B". In the present embodiment, the connecting part 11 has a recessed shape and the connected part 21 has a protruded shape, and the battery pack 50 and the adapter "B" are connected mechanically and electrically by fitting the connected part 21 into the connecting part 11. However, another connection structure can be used so long as the battery pack 50 and the adapter "B" are connected mechanically and electrically.

The battery pack 50 incorporates therein a voltage monitoring unit 22 and a temperature monitoring unit 23 in addition to the secondary battery to be charged up (recharged). The voltage monitoring unit 22 is constituted by a cell voltage monitoring IC configured to monitor a cell voltage of the secondary battery 20. The temperature monitoring unit 23 is constituted by a thermistor configured to monitor a temperature of the secondary battery 20. The voltage monitoring unit 22 and the temperature monitoring unit 23 are electrically connected to the controller 1 inside the charger "A" via the adapter "B". The voltage monitoring unit 22 outputs a voltage signal to the controller 1 and the temperature monitoring unit 23 outputs a temperature signal to the controller 1.

As mentioned above, in the charging system "S" of the present embodiment, to enable charging the battery packs 50 of the plural types, the adapters "B" of the plural types are prepared. With regard to the particular battery pack 50, the adapter "B" dedicated to the particular battery pack 50 is allowed to be connected thereto, but the other adapters "B" are not allowed to be connected thereto. Whether or not the connection of the adapter "B" to the battery pack 50 is possible is determined based on whether or not the connecting part 11 and the connected part 21 can be connected mechanically.

Hence, based on the adapter identification signal outputted from the resistor 12 of the adapter "B", the controller 1 of the charger "A" can determine which type of adapters "B" is connected, that is, which type of the secondary batteries 20 is included in the connected battery pack 50.

The controller 1 of the charger "A" recharges the secondary battery 20 of the battery pack 50 in conformity with a charging control program selected based on the adapter identification signal to be outputted. In the present embodiment, a charging control process is mainly classified into a specified battery charging control process and an unspecified battery charging control process. The specified battery charging control process is defined as a charging control process optimal to the secondary battery 20 of a particular type. The specified battery charging control processes of the plural types are preliminarily stored. The unspecified battery charging control process is defined as a charging control process enabling safe charging of the secondary battery 20 of a different type from the particular type. The unspecified battery charging control process is stored in addition to the specified battery charging control processes of the plural types.

In the specified battery charging control process, a charging control defined by a combination of CC charging and CV charging is performed based on a program peculiar to the specified secondary battery 20. Especially, at first the CC charging with a predetermined charging current value is performed, and when the secondary battery is charged up to about 80%, the CC charging is terminated and the CV charging with a predetermined charging voltage value is started. In this regard, the charging voltage value is selected from plural values according to a battery temperature measured by the temperature monitoring unit 23. For example, when the battery temperature measured falls within a normal temperature range of 10 to 45° C., the charging voltage value has 4.2 V/cell. When the battery temperature measured falls within a high temperature range having a lower limit greater than 45° C., the charging voltage value has 4.0 V/cell. When the battery temperature measured falls within a low temperature range having an upper limit less than 10° C., the charging voltage value has 3.9 V/cell. The detailed definitions of the temperature ranges and the charging voltage values for the respective temperature ranges are different for each manufacturer of the second battery 20.

Also in the unspecified battery charging control process, the charging control defined by the combination of the CC charging and the CV charging is performed. Especially, at first the CC charging with the charging current value dedicated to the unspecified battery charging is performed and subsequently the CV charging with the charging voltage value dedicated to the unspecified battery charging is performed.

The charging current value used in the unspecified battery charging control process is selected to be equal to or less than a minimum value of all of the charging current values used in the respective specified battery charging control processes of the plural types stored. Especially, when the minimum value of all of the charging current values used in the respective specified battery charging control processes is 2 A, the charging current value used in the unspecified battery charging control process is selected to be equal to or less than 2 A. Further, the charging current value may be determined according to the temperature. For example, the charging current value may be 2 A in the high temperature range and the low temperature range, and the charging current value may be 2.1 A in the normal temperature range. In any case, it is sufficient that the charging current value used in the unspecified battery charging control process for each temperature is selected to be equal to or less than a minimum value of all of the charging current values used in the respective specified battery charging control processes of the types stored.

Additionally, the charging voltage value used in the unspecified battery charging control process is also selected to be equal to or less than a minimum value of all of the charging voltage values used in the respective specified battery charging control processes of the plural types stored. Especially, when the minimum value of all of the charging voltage values used in the respective specified battery charging control processes is 3.9 V/cell in an entire temperature range, the charging voltage value used in the unspecified battery charging control process is selected to be equal to or less than 3.9 V/cell. Further, the charging voltage value may be determined according to the temperature. For example, the charging voltage value may be 3.9 V/cell in the high temperature range and the low temperature range, and the charging voltage value may be 4.1 V/cell in the normal temperature range. In any case, it is sufficient that the charging voltage value used in the unspecified battery charging control process for each temperature is selected to be equal to or less than a minimum value of all of the charging voltage values used in the respective specified battery charging control processes of the plural types stored.

According to the charging system "S" of the present embodiment, with regard to the battery pack 50 of the specified type of which an appropriate charging control method is known, the controller 1 of the charger "A" acknowledges the connection of this battery pack 50 based on the adapter identification signal, and charges up the battery pack 50 by performing the proper charging control process (i.e., the specified battery charging control process) preliminarily stored.

In contrast, with regard to the battery pack 50 of a different type from the specified type, the controller 1 of the charger "A" acknowledges that the connected battery pack 50 is a different type from the particular type based on the adapter identification signal, and thus performs the charging process based on not the specified battery charging control process but the unspecified battery charging control process.

In the unspecified battery charging control process, since the charging is not performed based on a condition optimal to the secondary battery 20 of the battery pack 50, the charging time is relatively long. However, as mentioned above, the charging current value and the charging voltage values are set to their minimum levels, the charging can be completed safely.

Consequently, the charging system "S" of the present embodiment enables using one of the adapters "B" of the plural types according to the type of the connected battery packs. Hence, with regard to the battery pack 50 of the specified type, the charging can be completed safely at a short time. Further, with regard to the battery pack 50 of a different type from the specified type, although the charging takes some time, it can be completed safely.

When the battery pack 50 including the secondary battery of a new type is marketed after a user buys the charger "A", with newly providing the adapter "B" having a shape dedicated and connectable to the battery pack 50 of the new type, the charging system "S" can be applied to the battery pack 50 of the new type. In this case, the adapter "B" is configured to incorporate therein the resistor 12 for indicating a type different from the specified type. When a user connects the battery pack 50 of the new type to the charger "A" via the newly provided adapter "B", although the charging takes some time, it can be completed safely in conformity with the program of the unspecified battery charging control process. Accordingly, there is no need to buy the new charger "A" for charging the battery pack 50 of the new type, and it is sufficient that a user buys only the newly provided adapter "B".

Further, as illustrated in following TABLE 1, the controller 1 of the charger "A" may be configured to select an output limiting voltage based on a resistance ("adapter identification resistance" in the table) of the resistor 12 defining the adapter identification signal. For safety measures against such as a breakage of a microcomputer, the controller 1 is configured to, when the charging voltage exceeds the output limiting voltage, terminate the charging.

TABLE 1

| adapter identification resistance | charging current | charging voltage (cell voltage threshold) | output limiting voltage |
|---|---|---|---|
| 1 kΩ | 1 A | 3.9 V/cell | 5 V |
| 2 kΩ | 2 A | 3.9 V/cell | 5 V |
| 3 kΩ | 2 A | 3.9 V/cell | 10 V |
| 3.9 kΩ | 3 A | 3.9 V/cell | 10 V |
| 4.3 kΩ | 3 A | 4.0 V/cell | 20 V |
| 5.1 kΩ | 5 A | 4.0 V/cell | 20 V |
| ... | ... | ... | ... |

In this case, as shown in above TABLE 1, the controller 1 stores the plural limiting voltages of 5 V, 10 V, 20 V, . . . , for example. The controller 1 selects one from the plural limiting voltages according to the adapter identification resistance of the connected adapter "B". In this regard, for example, the controller 1 stores a table (e.g., see TABLE 1) indicative of a correspondence relation between the adapter identification resistance and a set of the charging current, the charging voltage, and the output limiting voltage.

Next, the charger "A" of the present embodiment is explained in detail.

In the following explanation, a first battery 500, a second battery 501, a third battery 502, and a fourth battery 503 are taken as examples of the battery (battery pack) 50.

Figure 2:
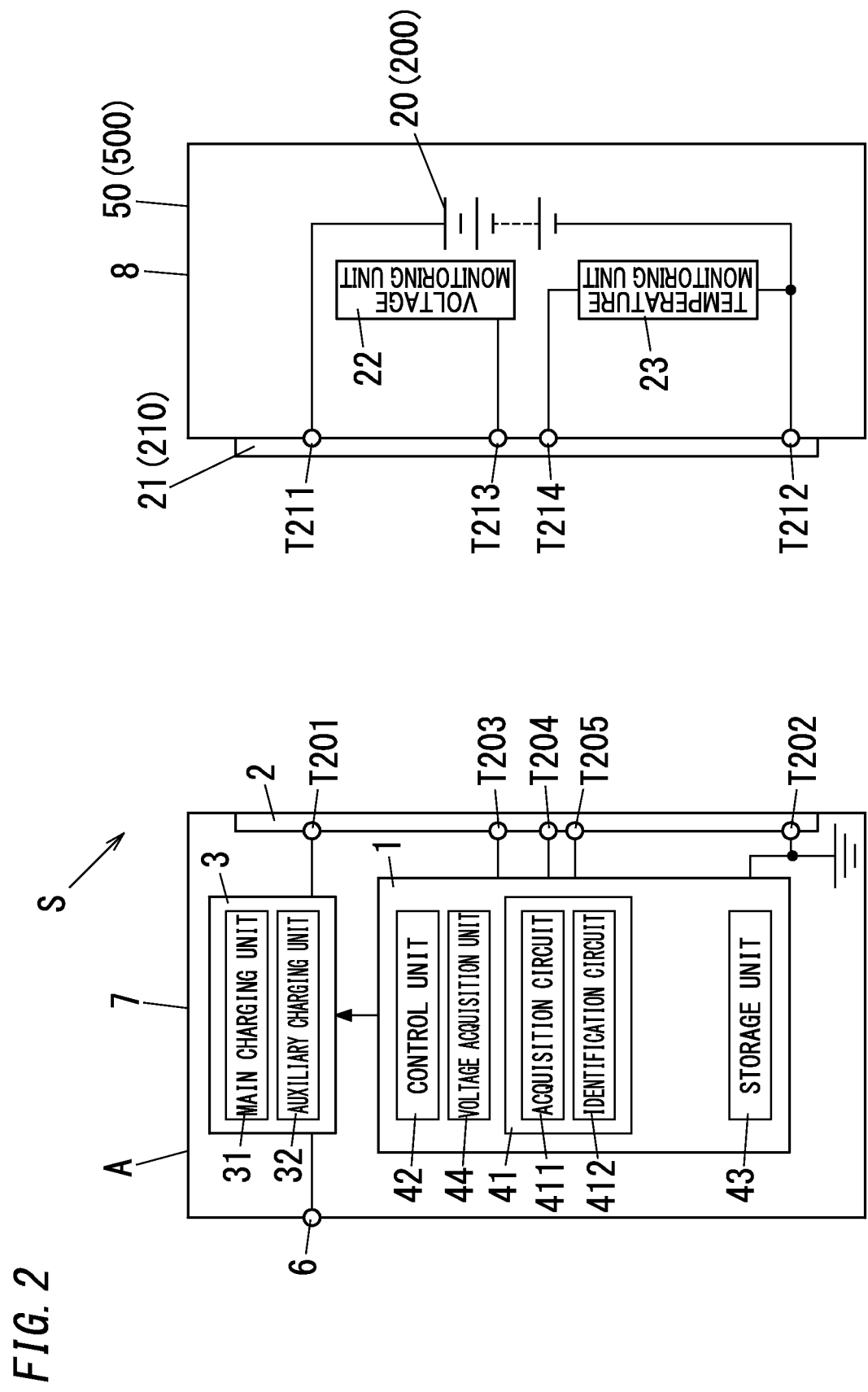
FIG. 2 is a block diagram illustrating a charger of the above first embodiment and a battery.

As shown in FIG. 2, the battery 50 includes the secondary battery 20, the connected part 21, the voltage monitoring unit 22, the temperature monitoring unit 23, and a housing (battery housing) 8.

The battery housing 8 is formed into a box shape and is configured to accommodate the secondary battery 20, the voltage monitoring unit 22, and the temperature monitoring unit 23.

The connected part 21 is a connector for making connection with an external device (e.g., load devices, chargers, and adapters). The connected part 21 is provided to an outer surface of the battery housing 8. The connected part 21 includes a positive terminal T211, a negative terminal T212, a voltage output terminal T213, and a temperature output terminal T214. Each of the positive terminal T211, the negative terminal T212, the voltage output terminal T213, and the temperature output terminal T214 is exposed on the outer surface of the battery housing 8.

In the present embodiment, the shape of the connected part 21 is different for each of the batteries 500, 501, 502, and 503. In brief, the batteries 500, 501, 502, and 503 include the connected parts 21 (210, 211, 212, and 213) having mutually different shapes, respectively.

The secondary battery 20 is an assembled battery including five battery cells connected in series with each other. The voltage of the secondary battery 20 is equal to the sum of the voltages of the five battery cells. The secondary battery 20 has a positive electrode connected to the positive terminal T211 and a negative electrode connected to the negative terminal T212.

For example, the battery cell is a lithium-ion battery. Note that, the battery cell may be selected from a nickel-cadmium battery and a nickel-metal-hydride battery. Further, the number of battery cells is not limited five. Alternatively, the battery cells may be connected in parallel with each other or may be connected in series parallel with each other.

In the present embodiment, the type of the secondary battery 20 is different for each of the batteries 500, 501, 502, and 503. In brief, the batteries 500, 501, 502, and 503 includes the secondary batteries 20 (200, 201, 202, and 203) of the mutually different types, respectively. Hence, the charging method optimal to the secondary battery 20 is different for each of the batteries 50.

The voltage monitoring unit 22 is configured to measure the voltage of the secondary battery 20 and output the voltage signal indicative of the measured voltage to the voltage output terminal T213.

The temperature monitoring unit 23 is configured to measure the temperature of the secondary battery 20 and output the temperature signal indicative of the measured temperature to the temperature output terminal T214.

As shown in FIG. 2 to FIG. 5, the charger "A" of the present embodiment includes the connector (attaching part) 2, a charging unit 3, the controller 1, an external power terminal 6, and a housing 7.

The housing 7 is formed into a box shape and is configured to accommodate the charging unit 3 and the controller 1.

The external power terminal 6 is provided to an outer surface of the housing 7. The external power terminal 6 is configured to make connection with an external power source. In the present embodiment, the external power source is an AC power source (e.g., a commercial AC power source). Note that, the external power source may be a DC power source.

The connector 2 is used for making connection with the battery 50. The connector 2 is provided to an outer surface of the housing 7, and is designed in use to make mechanical connection with the connected part 210 of the first battery 500. In other words, the connector 2 has a shape corresponding to the connected part 210 of the first battery 500.

The connector 2 includes a charging terminal T201, a ground terminal T202, a voltage input terminal T203, a temperature input terminal T204, and an identification terminal T205. Each of the charging terminal T201, the ground terminal T202, the voltage input terminal T203, the temperature input terminal T204, and the identification terminal T205 is exposed on the outer surface of the housing 7.

When the connected part 210 of the first battery 500 is connected to the connector 2, the charging terminal T201, the ground terminal T202, the voltage input terminal T203, and the temperature input terminal T204 are connected to the positive terminal T211, the negative terminal T212, the voltage output terminal T213, and the temperature output terminal T214, respectively. Besides, the first battery 500 has no terminal corresponding to the identification terminal T205.

As mentioned above, the shape of the connected part 21 is different for each of the batteries 500, 501, 502, and 503. Hence, the batteries 501, 502, and 503 cannot be directly connected to the connector 2.

Figure 3:
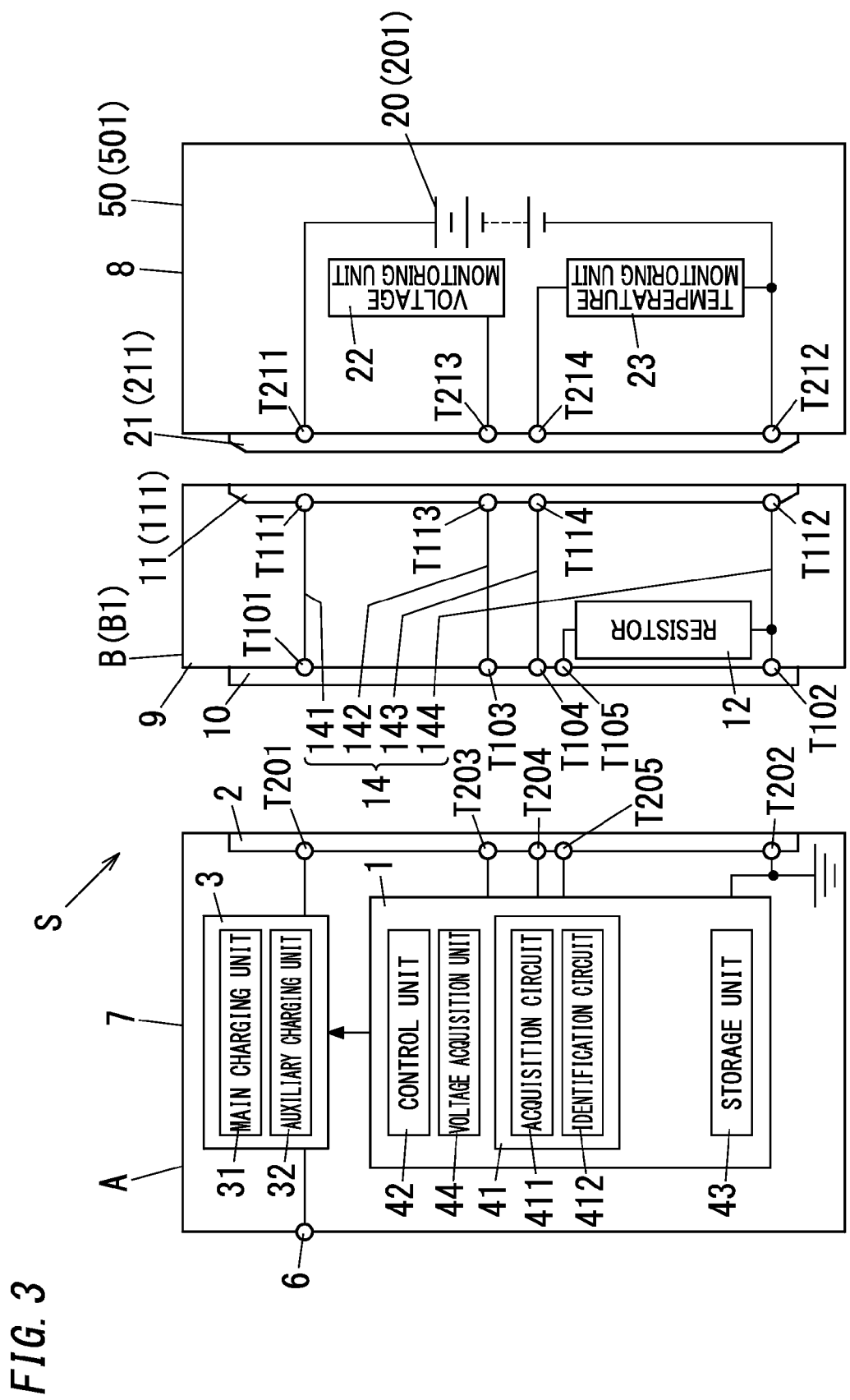
FIG. 3 is a block diagram illustrating the charging system of the above first embodiment and a battery.
Figure 4:
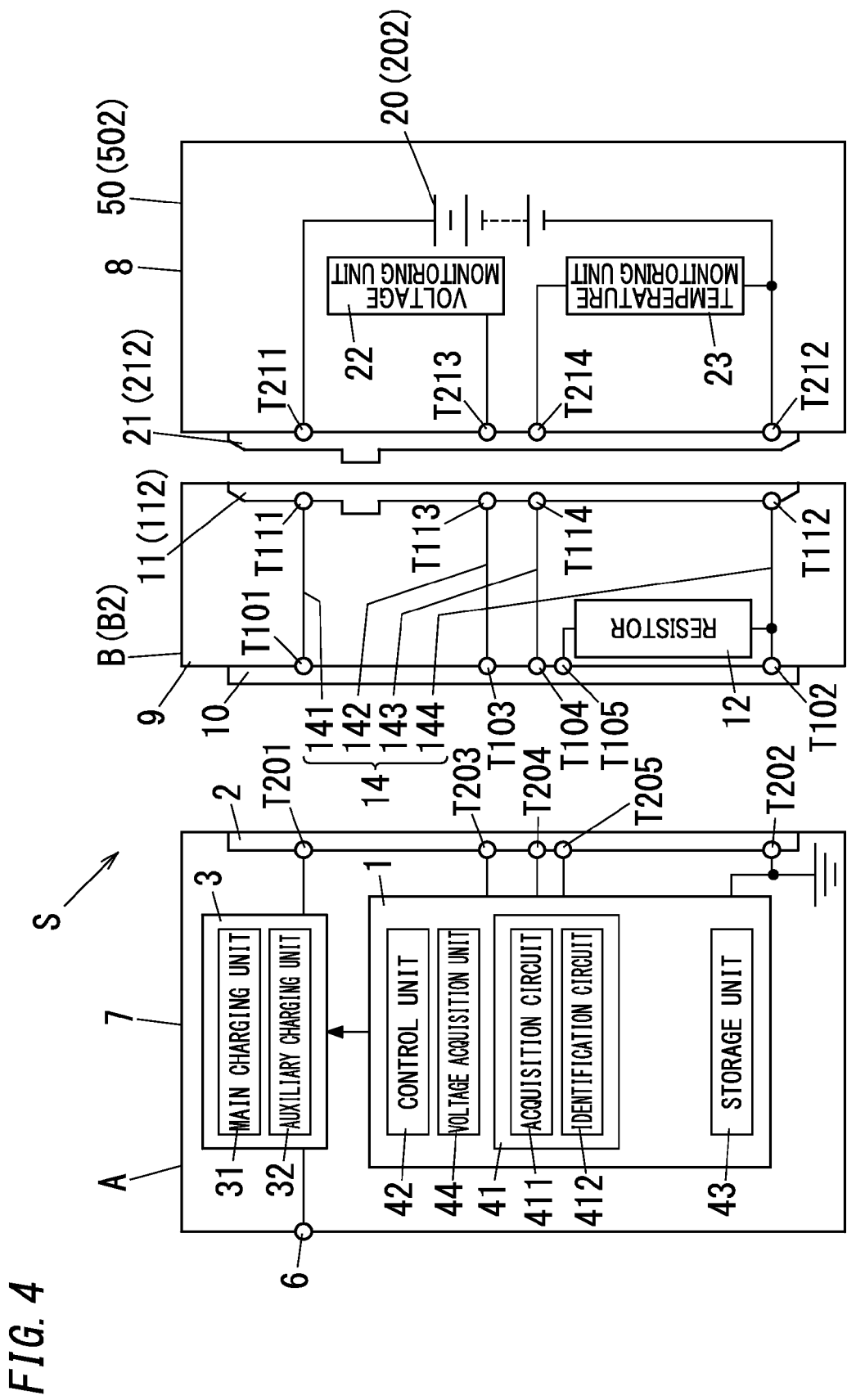
FIG. 4 is a block diagram illustrating the charging system of the above first embodiment and a battery.
Figure 5:
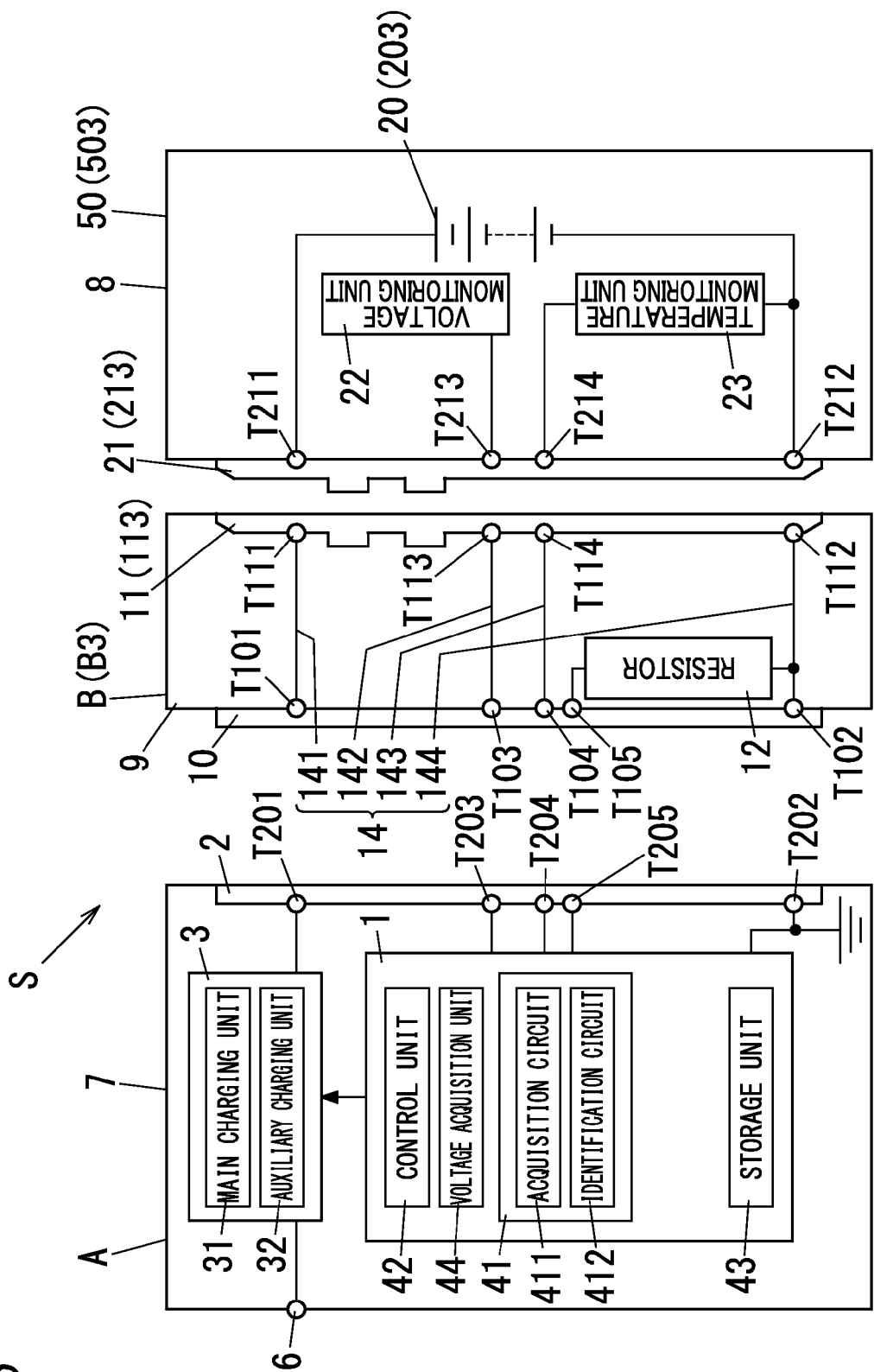
FIG. 5 is a block diagram illustrating the charging system of the above first embodiment and a battery.

Thus, to connect the second battery 501 to the connector 2, the adapter "B" (the first adapter "B1") shown in FIG. 3 is used. Further, to connect the third battery 502 to the connector 2, the adapter "B" (the second adapter "B2") shown in FIG. 4 is used. Furthermore, to connect the fourth battery 503 to the connector 2, the adapter "B" (the third adapter "B3") shown in FIG. 5 is used.

Accordingly, in the present embodiment, the first battery 500 is classified into a compliant battery allowed to be directly connected to the connector 2. Each of the second, third, and fourth batteries 501, 502, and 503 is classified into a non-compliant battery allowed to be indirectly connected to the connector 2 (by use of the adapter "B").

Each adapter "B" includes the first connector (attached part) 10, the second connector (connecting part) 11, a connection circuit 14, the resistor 12, and a housing (adapter housing) 9.

The adapter housing 9 is formed into a box shape and is configured to accommodate the connection circuit 14 and the resistor 12.

The first connector 10 is defined as a connector used for making connection with the charger "A". The first connector 10 is provided to an outer surface of the adapter housing 9, and is designed in use to make mechanical connection with the connector 2 of the charger "A". In other words, the first connector 10 has a shape corresponding to the shape of the connector 2 of the charger "A".

The first connector 10 includes a first power terminal T101, a first ground terminal T102, a first voltage terminal T103, a first temperature terminal T104, and a signal terminal T105. Each of the first power terminal T101, the first ground terminal T102, the first voltage terminal T103, the first temperature terminal T104, and the signal terminal T105 is exposed on the outer surface of the adapter housing 9.

When the first connector 10 is connected to the connector 2, the charging terminal T201, the ground terminal T202, the voltage input terminal T203, the temperature input terminal T204, and the identification terminal T205 are connected to the first power terminal T101, the first ground terminal T102, the first voltage terminal T103, the first temperature terminal T104, and the signal terminal T105, respectively.

The second connector 11 is defined as a connector used for making connection with the battery 50. The second connector 11 is provided to the outer surface of the adapter housing 9.

Further, the second connector 11 includes a second power terminal T111, a second ground terminal T112, a second voltage terminal T113, and a second temperature terminal T114. Each of the second power terminal T111, the second ground terminal T112, the second voltage terminal T113, and the second temperature terminal T114 is exposed on the outer surface of the adapter housing 9.

When the battery 50 is connected to the adapter "B", the second power terminal T111, the second ground terminal T112, the second voltage terminal T113, and the second temperature terminal T114 are connected to the positive terminal T211, the negative terminal T212, the voltage output terminal T213, and the temperature output terminal T214, respectively.

In the present embodiment, the shape of the second connector 11 is different for each of the adapters "B1", "B2", and "B3". In brief, the adapters "B1", "B2", and "B3" include the second connectors 11 (111, 112, and 113) having mutually different shapes, respectively.

The second connector 111 of the first adapter "B1" is designed in use to make mechanical connection with the connected part 211 of the second battery 501. In other words, the second connector 111 has a shape corresponding to the shape of the connected part 211 of the second battery 501.

The second connector 112 of the second adapter "B2" is designed in use to make mechanical connection with the connected part 212 of the third battery 502. In other words, the second connector 112 has a shape corresponding to the shape of the connected part 212 of the third battery 502.

The second connector 113 of the third adapter "B3" is designed in use to make mechanical connection with the connected part 213 of the fourth battery 503. In other words, the second connector 113 has a shape corresponding to the shape of the connected part 213 of the fourth battery 503.

The connection circuit 14 is interposed between the first connector 10 and the second connector 11 and electrically connecting the second connector 12 to the first connector 11. The connection circuit 14 includes connection parts 141, 142, 143, and 144 configured to connect the second power terminal T111, the second ground terminal T112, the second voltage terminal T113, and the second temperature terminal T114 to the first power terminal T101, the first ground terminal T102, the first voltage terminal T103, and the first temperature terminal T104, respectively.

The resistor 12 is connected between the signal terminal T105 and the first ground terminal T102. The resistance of the resistor 12 is determined according to the battery 50 allowed to be directly connected to the second connector 11. In brief, the resistance of the resistor 12 represents the type of the battery 50. Thus, in the present embodiment, the resistor 12 defines an identification unit having information indicative of the non-compliant battery allowed to be directly connected to the second connector 11. For example, the resistor 12 of the first adapter "B1" has the resistance of 1 kΩ, and the resistor 12 of the second adapter "B2" has the resistance of 4.3 kΩ, and the resistor 12 of the third adapter "B3" has the resistance of 0.5 kΩ.

As mentioned above, in the present embodiment, the first battery 500 is directly connected to the charger "A". In contrast, the batteries 501, 502, and 503 are not allowed to be directly connected to the charger "A" but are allowed to be indirectly connected to the charger "A" by use of the corresponding adapters "B1", "B2", and "B3", respectively.

The charging unit 3 is configured to charge (recharge) the battery 50 connected to the connector 2. The charging unit 3 includes a main charging unit 31 and an auxiliary charging unit 32.

The main charging unit 31 is configured to charge the compliant battery (first battery 500) in conformity with a main charging condition appropriate to the compliant battery (first battery 500). For example, a circuit configuration of the main charging unit 31 is designed such that the compliant battery can be charged in conformity with an optimal charging condition.

For example, the main charging unit 31 includes an AC/DC converter, a constant voltage circuit, and a constant current circuit. The AC/DC converter is designed to generate a DC voltage having a predetermined value by utilizing AC power received via the external power terminal 6. The constant voltage circuit is designed to generate a constant voltage by utilizing the DC voltage obtained from the AC/DC converter. The constant current circuit is designed to generate a constant current by utilizing the DC voltage obtained from the AC/DC converter. Note that, the main charging unit 31 may include filters, if necessary. Besides, when the external power source is a DC power source, the AC/DC converter is replaced by a DC/DC converter.

In the present embodiment, the main charging unit 31 is configured to charge the compliant battery by means of supplying a predetermined constant current to the compliant battery unless the voltage of the compliant battery is less than a predetermined threshold, and charge the compliant battery by means of applying a predetermined constant voltage to the compliant battery after the voltage of the compliant battery is not less than the predetermined threshold. The predetermined threshold, the value of the constant current, and the value of the constant voltage are determined according to the compliant battery 50. Hence, according to the main charging unit 31, the compliant battery 50 can be charged under the optimal charging condition.

The auxiliary charging unit 32 is configured to charge the non-compliant battery (the second battery 501, the third battery 502, the fourth battery 503) in conformity with an auxiliary charging condition which does not cause a harmful effect on the non-compliant battery (the second battery 501, the third battery 502, the fourth battery 503). The auxiliary charging unit 32 may use a charging method which enables safely charging the secondary battery 20 irrespective of the type thereof so long as the secondary battery 20 has possibilities to be connected to the charger "A".

For example, the auxiliary charging unit 32 may be configured to charge the non-compliant battery by means of supplying a constant current to the non-compliant battery. Alternatively, the auxiliary charging unit 32 may be configured to charge the non-compliant battery by means of applying a constant voltage to the non-compliant battery.

In the present embodiment, the auxiliary charging unit 32 is configured to selectively perform a constant current charging process of supplying a constant current to the non-compliant battery to charge the non-compliant battery, and a constant voltage charging process of applying a constant voltage to the non-compliant battery to charge the non-compliant battery.

For example, the auxiliary charging unit 32 is configured to charge the non-compliant battery by means of supplying a predetermined constant current to the non-compliant battery unless the voltage of the non-compliant battery is less than a predetermined threshold, and charge the non-compliant battery by means of applying a predetermined constant voltage to the non-compliant battery after the voltage of the non-compliant battery is not less than the predetermined threshold. Note that, the predetermined threshold, the value of the constant current, and the value of the constant voltage are determined according to the auxiliary charging condition.

Note that, in the present embodiment, an electric circuit constituting the main charging unit 31 is also used as the auxiliary charging unit 32. In contrast, the main charging unit 31 and the auxiliary charging unit 32 may be constituted by different electric circuits.

The controller 1 includes an identification unit 41, a control unit 42, a storage unit 43, and a voltage acquisition unit 44.

The voltage acquisition unit 44 is configured to acquire a value of a voltage of the battery 50 being connected to the connector 2. For example, the voltage acquisition unit 44 is configured to receive the voltage signal from the voltage monitoring unit 22 of the battery pack 50 via the voltage input terminal T203. The voltage acquisition unit 44 is configured to acquire the value of the voltage of the battery 50 based on the received voltage signal. Alternatively, the voltage acquisition unit 44 may be configured to measure the voltage of the battery 50 by means of measuring a voltage between the charging terminal T201 and the ground terminal T202. The voltage acquisition unit 44 is configured to provide the value of the voltage of the battery 50 to the control unit 42.

The storage unit 43 is configured to store a plurality of the auxiliary charging conditions. In the present embodiment, the auxiliary charging unit 32 charges the non-compliant battery by means of supplying a predetermined constant current to the non-compliant battery until the voltage of the non-compliant battery is not less than a predetermined threshold, and charges the non-compliant battery by means of applying a predetermined constant voltage to the non-compliant battery after the voltage of the non-compliant battery is not less than the predetermined threshold. The auxiliary charging condition includes information of the charging current indicative a value of the constant current to be supplied to the battery 50 and information of the charging voltage indicative of a value of the constant voltage to be applied to the battery 50. Further, the auxiliary charging condition includes information of the output limiting voltage indicative of a threshold defining the timing of terminating charging the battery 50.

The auxiliary charging condition is defined as a condition for charging the non-compliant battery such that a harmful effect on the non-compliant battery is not caused. Hence, the charging current and the charging voltage of the auxiliary charging condition are selected to be values such that the non-compliant battery does not suffer from a harmful effect. In other words, the auxiliary charging condition is defined as a condition under which the non-compliant battery is charged safely though it takes long time to charge the non-compliant battery.

Further, the plurality of the auxiliary charging conditions includes plural specified battery charging conditions (see TABLE 1) respectively corresponding to plural specified batteries classified into the non-compliant battery and an unspecified battery charging condition.

For example, the second battery 501 and the third battery 502 are classified into the specified battery. The specified battery charging condition for the second battery 501 is determined according to the type of the secondary battery 201 of the second battery 501. For example, with regard to the specified battery charging condition for the second battery 501, the charging current is 1 A, and the charging voltage is 3.9 V/cell, and the output limiting voltage is 5 V. The specified battery charging condition for the third battery 502 is determined according to the type of the secondary battery 202 of the third battery 502. For example, with regard to the specified battery charging condition for the third battery 502, the charging current is 3 A, and the charging voltage is 4.0 V/cell, and the output limiting voltage is 20 V.

The unspecified battery charging condition is defined as a charging condition used for a battery (unspecified battery) which is not corresponding to any of the plural specified batteries out of the non-compliant batteries. In other words, each of the batteries classified into the unspecified battery is charged under the unspecified battery charging condition. In the present embodiment, the fourth battery 503 is classified into the non-compliant battery but is not corresponding to any of the specified batteries. Hence, the fourth battery 503 is classified into the unspecified battery.

This unspecified battery charging condition indicates the charging current and the charging voltage which are selected to be relatively low values such that any unspecified battery can be charged without suffering from a harmful effect.

For example, the value of the constant current indicated by the unspecified battery charging condition is not greater than a minimum of the values of the constant currents indicated by the respective plural specified battery charging conditions. Further, the value of the constant voltage indicated by the unspecified battery charging condition is not greater than a minimum of the values of the constant voltages indicated by the respective plural specified battery charging conditions. Furthermore, the value of the output limiting voltage indicated by the unspecified battery charging condition is not greater than a minimum of the values of the output limiting voltages indicated by the respective plural specified battery charging conditions.

In the present embodiment, the specified battery includes the second battery 501 and the third battery 502. In other words, the secondary batteries 20 of the second battery 501 and the third battery 502 are classified into the secondary battery of the specified type. Therefore, with regard to the second battery 501 and the third battery 502, the specified battery charging control process is performed. In contrast, since the fourth battery 503 is corresponding to the unspecified battery, the secondary battery 20 of the fourth battery 503 is classified into the secondary battery of the different type from the specified type. Therefore, with regard to the fourth battery 503, the unspecified battery charging control process is performed.

Consequently, the charging current of the unspecified battery charging condition has 0.5 A which is not greater than the minimum (1 A) of the values of the constant currents indicated by the plural specified battery charging conditions for the second battery 501 and the third battery 502 respectively. Further, the charging voltage of the unspecified battery charging condition has 3.9 V which is not greater than the minimum (3.9 V) of the values of the constant voltages indicated by the plural specified battery charging conditions of the second battery 501 and the third battery 502 respectively. Furthermore, the output limiting voltage of the unspecified battery charging condition has 5 V which is not greater than the minimum (5 V) of the values of the output limiting voltages indicated by the plural specified battery charging conditions of the second battery 501 and the third battery 502 respectively.

The identification unit 41 is configured to perform an identification process of judging whether the battery 50 being connected to the connector 2 is the compliant battery or the non-compliant battery, and output a result (identification result) of the identification process to the control unit 42. Further, the identification unit 41 is configured to, in the identification process, upon concluding that the battery 50 being connected to the connector 2 is the non-compliant battery, further judge whether the battery is any one of the plural specified batteries or the unspecified battery different from the plural specified batteries.

The identification unit 41 includes an acquisition circuit 411 and an identification circuit 412. The acquisition circuit 411 is configured to acquire type information representing a type of the battery 50 in response to connection of the battery 50 to the connector 2. In this regard, when the adapter "B" is connected to the charger "A", the resistor 12 is connected between the identification terminal T205 and the ground terminal T202. Thus, in the present embodiment, the acquisition circuit 411 is configured to measure a resistance between the identification terminal T205 and the ground terminal T202 and output the resultant resistance to the identification circuit 412. Note that, when the first battery 500 is connected to the charger "A", no resistor 12 is connected between the identification terminal T205 and the ground terminal T202. Hence, the resistance between the identification terminal T205 and the ground terminal T202 is an infinite.

As mentioned above, in the present embodiment, the identification terminal T205 and the ground terminal T202 of the connector 2 serve as two identification terminals for identifying the type of the battery 50. The type information is defined as the resistance between the paired identification terminals.

The identification circuit 412 is configured to perform the identification process based on the type information acquired by the acquisition circuit 411. In brief, the identification circuit 412 performs the identification process based on the resistance obtained from the acquisition circuit 411. When acknowledging that the resistance obtained from the acquisition circuit 411 is not less than a predetermined value, the identification circuit 412 concludes that the resistance is an infinite, and determines that the battery 50 being connected to the connector 2 is corresponding to the compliant battery. Thus, the identification result indicates the compliant battery. Note that, the predetermined value is selected to be a value (e.g., 10 kΩ) greater than a maximum of the resistances of the resistors 12.

When acknowledging that the resistance obtained from the acquisition circuit 411 is not an indefinite (i.e., the resistance obtained from the acquisition circuit 411 is less than the predetermined value), the identification circuit 412 determines that the battery 50 being connected to the connector 2 is corresponding to the non-compliant battery, and further judges whether or not the battery is any one of the plural specified batteries or the unspecified battery. For example, when acknowledging that the resistance obtained from the acquisition circuit 411 is 2 kΩ, the identification circuit 412 concludes that the battery 50 being connected to the connector 2 is the second battery 501 which is one of the specified batteries. Moreover, when acknowledging that the resistance obtained from the acquisition circuit 411 is 1 kΩ, the identification circuit 412 concludes that the battery 50 being connected to the connector 2 is the unspecified battery.

The control unit 42 is configured to receive the identification result from the identification unit 41. The control unit 42 is configured to, when the identification result received from the identification unit 41 indicates the compliant battery, activate the main charging unit 31.

The control unit is configured to, when the identification result received from the identification unit 41 indicates the non-compliant battery, activate the auxiliary charging unit 32. Further, the control unit 42 is configured to, when the identification result indicates the specified battery, retrieve the specified battery charging condition corresponding to the specified battery indicated by the identification result from the storage unit 43 and control the auxiliary charging unit 32 in conformity with the retrieved specified battery charging condition. In contrast, the control unit 42 is configured to, when the identification result indicates the unspecified battery, retrieve the unspecified battery charging condition from the storage unit 43 and control the auxiliary charging unit 32 in conformity with the retrieved unspecified battery charging condition.

Moreover, the control unit 42 is configured to judge whether or not the value of the voltage acquired by the voltage acquisition unit 44 is not less than the predetermined threshold (output limiting voltage). The control unit 42 is configured to, upon concluding that the value of the voltage acquired by the voltage acquisition unit 44 is not less than the predetermined threshold, terminate the operation of the auxiliary charging unit 32. The auxiliary charging condition indicates the output limiting voltage. Thus, the output limiting voltage corresponding to the battery 50 can be used.

Figure 6:
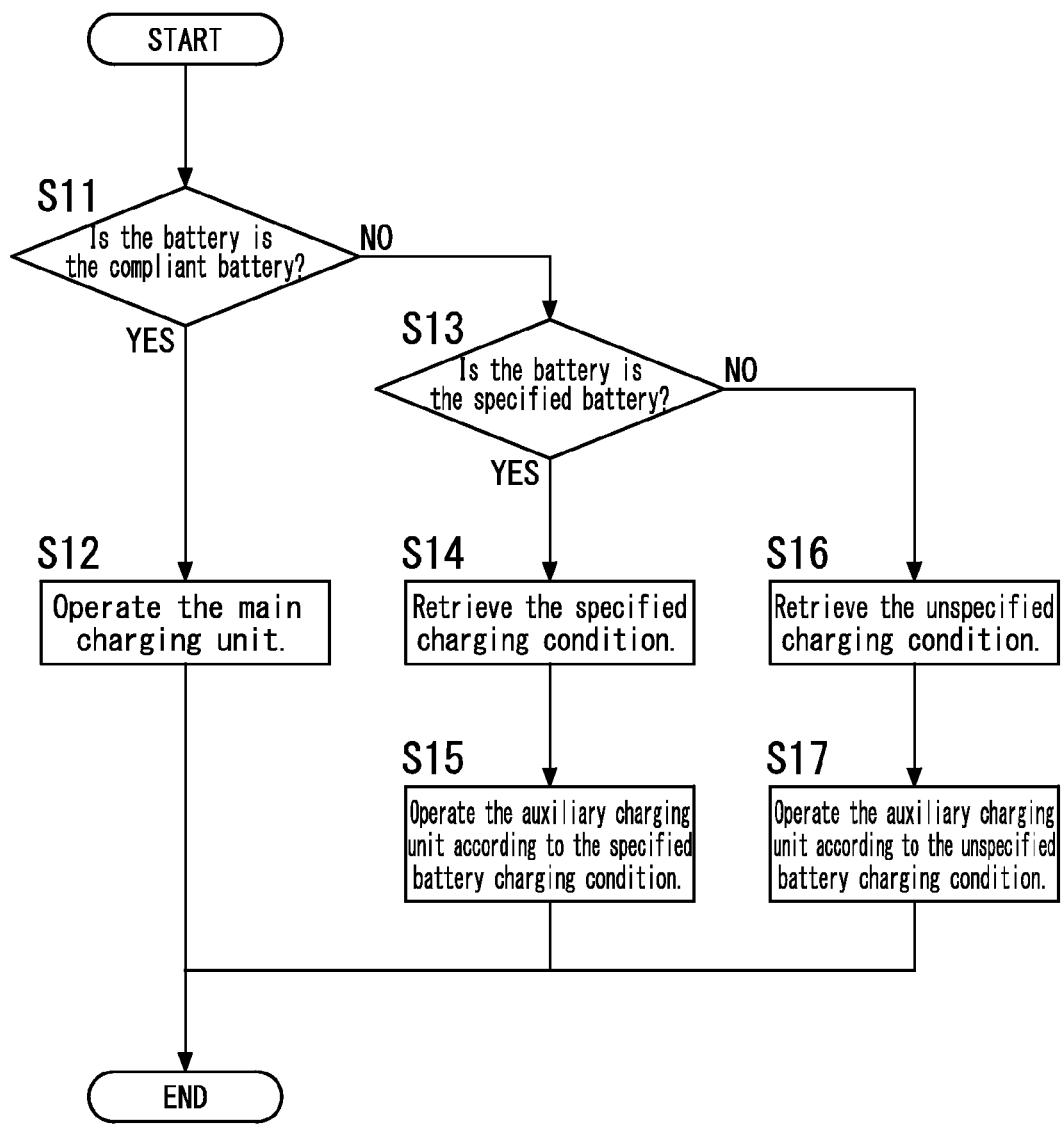
FIG. 6 is a flowchart illustrating an operation of the charger of the above first embodiment.

The following explanation referring to FIG. 6 is made to an operation of the charger "A" of the present embodiment.

The charger "A" judges whether the battery 50 being connected to the connector 2 is the compliant battery or the non-compliant battery (S11).

When the first battery 500 is connected to the connector 2, no resistor 12 is connected to the identification terminal T205. Hence, the resistance between the identification terminal T205 and the ground terminal T202 is not less than the predetermined value. Therefore, the identification unit 41 determines that the battery 50 being connected to the connector 2 is the compliant battery (S11, "YES"). In this case, since the identification result indicates the compliant battery, the control unit 42 activates the main charging unit 31 (S12). Consequently, the first battery 500 is charged in conformity with the charging condition appropriate to the first battery 500.

When the second battery 501 is connected to the connector 2 by use of the first adapter "B1", the resistor 12 of the first adapter "B1" is connected between the identification terminal T205 and the ground terminal T202. Hence, the resistance between the identification terminal T205 and the ground terminal T202 is 1 kΩ, and is less than the predetermined value (10 kΩ). Therefore, the identification unit 41 determines that the battery 50 being connected to the connector 2 is the non-compliant battery (S11, "NO"). Subsequently, the identification unit 41 judges whether the battery 50 being connected to the connector 2 is corresponding to any one of the plural specified batteries (S13). Since the resistance (1 kΩ) of the resistor 12 of the first adapter "B1" is corresponding to the second battery 501 classified into the specified battery, the identification unit 41 determines that the battery 50 being connected to the connector 2 is second battery 501 which is one of the specified batteries (S13, "YES"). In this case, since the identification result indicates the second battery 501, the control unit 42 retrieves the auxiliary charging condition corresponding to the second battery 501 (i.e., the specified battery charging condition for the second battery 501) from the storage unit 43 (S14). According to the auxiliary charging condition corresponding to the second battery 501, the charging current is 2 A, and the charging voltage is 3.9 V/cell, and the output limiting voltage is 5 V. The control unit 42 operates the auxiliary charging unit 32 in conformity with the retrieved auxiliary charging condition (S15). Consequently, the second battery 501 is charged under the condition which does not cause a harmful effect on the second battery 501.

When the third battery 502 is connected to the connector 2 by use of the second adapter "B2", the resistor 12 of the second adapter "B2" is connected between the identification terminal T205 and the ground terminal T202. Hence, the resistance between the identification terminal T205 and the ground terminal T202 is 4.3 kΩ, and is less than the predetermined value (10 kΩ). Therefore, the identification unit 41 determines that the battery 50 being connected to the connector 2 is the non-compliant battery (S11, "NO"). Subsequently, the identification unit 41 judges whether the battery 50 being connected to the connector 2 is corresponding to any one of the plural specified batteries (S13). Since the resistance (4.3 kΩ) of the resistor 12 of the second adapter "B2" is corresponding to the third battery 502 classified into the specified battery, the identification unit 41 determines that the battery 50 being connected to the connector 2 is third battery 501 which is one of the specified batteries (S13, "YES"). In this case, since the identification result indicates the third battery 501, the control unit 42 retrieves the auxiliary charging condition corresponding to the third battery 502 (i.e., the specified battery charging condition for the third battery 502) from the storage unit 43 (S14). According to the auxiliary charging condition corresponding to the third battery 502, the charging current is 3 A, and the charging voltage is 4.0 V/cell, and the output limiting voltage is 20 V. The control unit 42 operates the auxiliary charging unit 32 in conformity with the retrieved auxiliary charging condition (S15). Consequently, the third battery 502 is charged under the condition which does not cause a harmful effect on the third battery 502.

When the fourth battery 503 is connected to the connector 2 by use of the third adapter "B3", the resistor 12 of the third adapter "B3" is connected between the identification terminal T205 and the ground terminal T202. Hence, the resistance between the identification terminal T205 and the ground terminal T202 is 0.5 kΩ, and is less than the predetermined value (10 kΩ). Therefore, the identification unit 41 determines that the battery 50 being connected to the connector 2 is the non-compliant battery (S11, "NO"). Subsequently, the identification unit 41 judges whether the battery 50 being connected to the connector 2 is corresponding to any one of the plural specified batteries (S13). Since the resistance (0.5 kΩ) of the resistor 12 of the third adapter "B3" is not corresponding to any of the specified batteries, the identification unit 41 determines that the battery 50 being connected to the connector 2 is the unspecified battery (S13, "NO"). In this case, since the identification result indicates the unspecified battery, the control unit 42 retrieves the auxiliary charging condition corresponding to the unspecified battery (i.e., the unspecified battery charging condition) from the storage unit 43 (S16). According to the unspecified battery charging condition, the charging current is 0.5 A, and the charging voltage is 3.9 V/cell, and the output limiting voltage is 5 V. The control unit 42 operates the auxiliary charging unit 32 in conformity with the retrieved unspecified battery charging condition (S17). Consequently, the fourth battery 503 is charged under the condition which does not cause a harmful effect on the fourth battery 503.

Note that, the charger "A" may judge whether or not the battery 50 is connected to the connector 2. In this case, when concluding that the battery 50 is connected to the connector 2, the charger "A" starts the aforementioned step S11.

Besides, when the plural adapters "B" corresponding to the unspecified batteries are provided, the resistors 12 of these adapters "B" may have the same resistance or may have different resistances. In short, it is sufficient that the resistor 12 of the adapter "B" corresponding to the unspecified battery has a different resistance from the resistances corresponding to the specified batteries.

Figure 7:
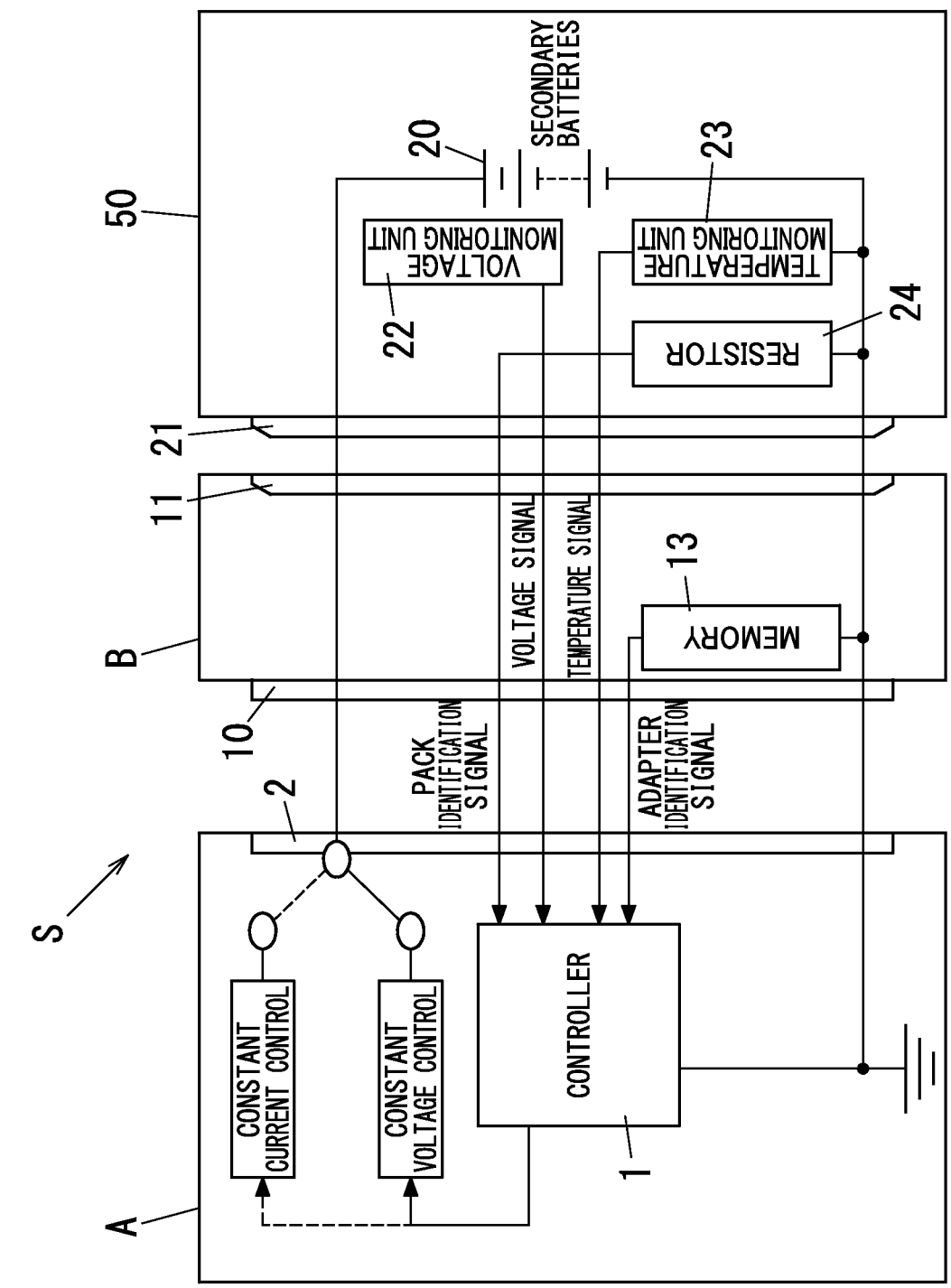
FIG. 7 is a schematic block diagram illustrating a charging system of the second embodiment.

The following explanation is made to the charging system "S" of the second embodiment in accordance with the present invention. FIG. 7 shows the charging system "S" of the present embodiment. Major components of the charging system "S" of the second embodiment are common to the charging system "S" of the first embodiment explained with reference to FIG. 1, and therefore the following detailed explanation is made to only different components of the second embodiment from those of the first embodiment.

Figure 8:
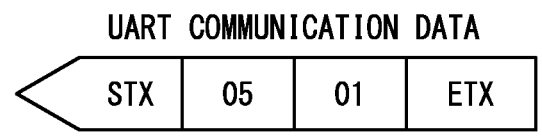
FIG. 8 is a diagram illustrating an identification signal used in the charging system of the above second embodiment.

The charging system "S" of the second embodiment includes a memory 13 as an alternative to the resistor 12 as explained in the first embodiment. The memory 13 is constituted by a ROM and is provided as an identifying means for outputting the adapter identification signal to the controller 1. When the adapter "B" is attached to the charger "A", the adapter identification signal is outputted from the memory 13 to the controller 1 based on the UART communication (see FIG. 8).

When the adapter "B" is connected to the charger "A", the memory 13 is connected to the identification terminal T205. Hence, in the second embodiment, the acquisition circuit 411 receives the identification signal (adapter identification signal) indicative of the type information via the identification terminal T205. Especially, the acquisition circuit 411 receives the adapter identification signal from the memory 13 through the UART communication. The identification circuit 412 performs the identification process based on the adapter identification signal obtained from the acquisition circuit 411.

Further, in the charging system "S" of the second embodiment, a resistor 24 is built in the battery pack 50 such that a pack identification signal is outputted from the resistor 24 to the controller 1. When the battery pack 50 is connected to the charger "A", the resistor 24 is electrically connected to the controller 1 inside the charger "A". An electric resistance of the resistor 24 defines the pack identification signal outputted to the controller 1.

Accordingly, the pack identification signal is outputted to the controller 1 in addition to the adapter identification signal. The controller 1 can determine the type of the secondary battery 20 and/or the type of the battery pack 50 incorporating therein this secondary battery 20 in detail based on a combination of the adapter identification signal and the pack identification signal, and can modifies the parameters for the charging condition according to the determination result. In other words, the adapter "B" may be configured to be connected to at least one of different batteries 50. In this case, based on the combination of the pack identification signal from the battery 50 and the adapter identification signal from the adapter "B", the identification unit 41 can identify the battery 50 in detail.

As explained above, each of the chargers "A" of the first and second embodiments includes the attaching part 2 to which one of the adapters "B" of the plural types respectively corresponding to the plural types of the secondary batteries 20 to be charged is attached selectively, and the controller 1 configured to charge the secondary battery 20 via the attached adapter "B". The controller 1 performs the different charging control processes including the plural specified battery charging control processes respectively dedicated to the secondary batteries 20 of the specified types and the unspecified battery charging control process provided for the secondary battery 20 different from the second batteries 20 of the specified types. When the secondary battery 20 to be charged is considered to be the specified type based on the identification information held by the attached adapter "B", the charging the secondary battery 20 is performed via the specified battery charging control process corresponding to the specified type. When the secondary battery 20 to be charged is considered to be the type different from the specified type, the charging the secondary battery 20 is performed via the unspecified battery charging control process.

In other words, the charger "A" of the present embodiment includes: the connector 2 adapted in use to be connected to the battery 50; the identification unit 41 configured to perform the identification process of judging whether the battery 50 being connected to the connector 2 is the compliant battery allowed to be directly connected to the connector 2 or the non-compliant battery allowed to be indirectly connected to the connector 2, and output the result of the identification process; the main charging unit 31 configured to charge the compliant battery in conformity with the main charging condition appropriate to the compliant battery; the auxiliary charging unit 32 configured to charge the non-compliant battery in conformity with the auxiliary charging condition which does not cause a harmful effect on the non-compliant battery; and the control unit 42 configured to receive the result from the identification unit 41, and, when the result indicates the compliant battery, activate the main charging unit 31, and, when the result indicates the non-compliant battery, activate the auxiliary charging unit 32.

In addition, the charger "A" of the present embodiment further includes the storage unit 43. The storage unit 43 is configured to store the plurality of the auxiliary charging conditions. The plurality of the auxiliary charging conditions includes the plural specified battery charging conditions respectively corresponding to plural specified batteries classified into the non-compliant battery and the unspecified battery charging condition. The identification unit 41 is configured to, in the identification process, upon concluding that the battery 50 being connected to the connector 2 is the non-compliant battery, further judge whether the battery 50 is any one of the plural specified batteries or the unspecified battery different from the plural specified batteries. The control unit 42 is configured to: when the result indicates the specified battery, retrieve the specified battery charging condition corresponding to the specified battery indicated by the result from the storage unit 43 and control the auxiliary charging unit 32 in conformity with the retrieved specified battery charging condition; and when the result indicates the unspecified battery, retrieve the unspecified battery charging condition from the storage unit 43 and control the auxiliary charging unit 32 in conformity with the retrieved unspecified battery charging condition.

Further, the identification unit 41 includes: the acquisition circuit 411 configured to acquire the type information representing the type of the battery 50 in response to connection of the battery 50 to the connector 2; and the identification circuit 412 configured to perform the identification process based on the type information acquired by the acquisition circuit 411.

According to the first embodiment, the connector 2 includes the two identification terminals (the identification terminal T205 and the ground terminal T202) for identifying the type of the battery 50. The acquisition circuit 411 is configured to measure the resistance between the two identification terminals. The type information is defined as the resistance between the two identification terminals.

According to the second embodiment, the connector 2 includes the single identification terminal T205 for identifying the type of the battery 50. The acquisition circuit 412 is configured to receive the identification signal indicative of the type information via the identification terminal T205.

Consequently, according to the charger "A" with the aforementioned configuration, it is possible to charge the secondary batteries 20 of the plural types by means of interposing corresponding one selected from the adapter between the secondary battery 20 and the charger "A". Therefore, the charger in accordance with the present invention is capable of facilitating charging the secondary batteries of the different types by use of charging methods appropriate thereto. Additionally, with regard to the secondary battery 20 of the specified type, the charging can be completed through the specified battery charging control process corresponding to this secondary battery 20. In contrast, with regard to the secondary battery 20 of the different type from the specified type, the charging can be completed safely through the unspecified battery charging control process. Especially, with utilizing the identification information of the connected adapter "B", it is possible to determine the type of the secondary battery 20 connected via this adapter "B" and perform the charging control appropriate to the determined type.

Further, with regard to the chargers "A" of the first and second embodiments, in each of the plural kinds of the specified battery charging control processes and the unspecified battery charging control process, the charging is performed by supplying the constant current having the predetermined charging current value. The charging current value in the unspecified battery charging control process is selected to be equal to or less than the minimum of the charging current values used in the respective specified battery charging control processes of plural types. In other words, the auxiliary charging unit 32 is configured to charge the non-compliant battery by supplying a constant current to the non-compliant battery. The auxiliary charging condition indicates a value of the constant current. The value of the constant current indicated by the unspecified charging condition is not greater than a minimum of the values of the constant currents indicated by the respective plural specified battery charging conditions.

Consequently, according to the charger "A" with the aforementioned configuration, with regard to the secondary battery 20 of the specified type, the charging can be completed safely and rapidly. Further, with regard to the secondary battery 20 of a different type from the specified type, although the charging takes some time, it can be completed safely.

Further, with regard to the chargers "A" of the first and second embodiments, in each of the plural kinds of the specified battery charging control processes and the unspecified battery charging control process, the charging is performed by applying the constant voltage having the predetermined charging voltage value. The charging voltage value in the unspecified battery charging control process is selected to be equal to or less than the minimum of the charging voltage values used in the respective specified battery charging control processes of plural types. In other words, the auxiliary charging unit 32 is configured to charge the non-compliant battery by applying a constant voltage to the non-compliant battery. The auxiliary charging condition indicates a value of the constant voltage. The value of the constant voltage indicated by the unspecified battery charging condition is not greater than a minimum of the values of the constant voltages indicated by the respective plural specified battery charging conditions.

Consequently, according to the charger "A" with the aforementioned configuration, with regard to the secondary battery 20 of the specified type, the charging can be completed safely and rapidly. Further, with regard to the secondary battery 20 of a different type from the specified type, although the charging takes some time, it can be completed safely.

Further, with regard to the chargers "A" of the first and second embodiments, the controller 1 terminates the charging when the charged voltage is not less than the predetermined limiting voltage. The controller 1 is configured to select a limiting voltage from the plural limiting voltages according to the identification signal. In other words, the charger "A" of the present embodiment further includes the voltage acquisition unit 44 configured to acquire the value of the voltage of the battery 50 being connected to the connector 2. The control unit 42 is configured to judge whether or not the value of the voltage acquired by the voltage acquisition unit 44 is not less than the predetermined threshold (limiting voltage), and, upon concluding that the value of the voltage acquired by the voltage acquisition unit 44 is not less than the predetermined threshold, terminate an operation of the auxiliary charging unit 32. The auxiliary charging condition indicates the predetermined threshold (limiting voltage).

Consequently, according to the charger "A" with the aforementioned configuration, the charger "A" can select an appropriate voltage as the limiting voltage according to the type of the connected adapter "B" (i.e., the type of the secondary battery 20 to be charged).

Further, with regard to the adapter "B" of each of the first and second embodiments is defined as the adapter "B" which is connected to the charger "A" with the aforementioned configuration and includes the connecting part 11 having a shape and a size connectable to the corresponding secondary battery 20 and the identifying means having the identification information indicative of the corresponding secondary battery 20. In other words, the adapter "B" includes: the first connector 10 configured to allow the connector 2 of the charger "A" to be directly connected thereto; the second connector 11 configured to allow the non-compliant battery to be directly connected thereto; the connection circuit 14 interposed between the first connector 10 and the second connector 11 and configured to electrically connect the first connector 10 and the second connector 11 to each other; and the identification unit 12 having information indicative of the non-compliant battery allowed to be directly connected to the second connector 11.

Consequently, according to the adapter "B" with the aforementioned configuration, when the adapter "B" is connected to the charger "A", the adapter "B" enables the controller 1 of the charger "A" to identify the type of the adapter "B" (i.e., the type of the secondary battery 20 to be charged) based on the identification information held by this adapter "B".

Furthermore, with regard to the charging system "S" of each of the first and second embodiments is constituted by the charger "A" with the aforementioned configuration and the adapters "B" of the plural types with the aforementioned configuration. With connecting one of the adapters "B" of the plural types to the charger "A", the charger "A" can charge corresponding one of the secondary batteries 20 of the specified type and the different type from the specified type via the adapter "B". In other words, the charging system "S" includes the charger "A" and the adapter "B". The adapter "B" includes: the first connector 10 configured to allow the connector 2 of the charger "A" to be directly connected thereto; the second connector 11 configured to allow the non-compliant battery to be directly connected thereto; the connection circuit 14 interposed between the first connector 10 and the second connector 11 and configured to electrically connect the first connector 10 and the second connector 11 to each other; and the identification unit 12 having information indicative of the non-compliant battery allowed to be directly connected to the second connector 11.

Consequently, according to the charging system "S" with the above configuration, the common charger "A" can charge one of the secondary batteries 20 of the plural types through corresponding one of the adapters "B" of the plural types. Additionally, with regard to the secondary battery 20 of the specified type, the charging can be completed through the specified battery charging control process corresponding to this secondary battery 20 by use of the dedicated adapter "B". Further, with regard to the secondary battery 20 of the different type from the specified type, the charging can be completed safely through the unspecified battery charging control process by use of the adapter "B" different from the dedicated adapter "B". Especially, with utilizing the identification information of the connected adapter "B", it is possible to determine the type of the secondary battery 20 connected via this adapter "B" and perform the charging control appropriate to the determined type.

The above explanation referring to the attached drawings is made to the embodiments in accordance with the present invention. The present invention is not limited to the respective embodiments. Without departing from the intended scope of the present invention, the configurations of the respective embodiments can be appropriately modified and the configuration of one of the embodiments can be appropriately combined with the configuration of the other.

The invention claimed is:

1. A charger comprising:
    a connector adapted in use to be connected to a battery;
    an identification unit configured to perform an identification process of judging whether the battery being connected to the connector is a compliant battery allowed to be directly connected to the connector or a non-compliant battery allowed to be indirectly connected to the connector, and output a result of the identification process;
    a main charging unit configured to charge the compliant battery in conformity with a main charging condition appropriate to the compliant battery;

an auxiliary charging unit configured to charge the non-compliant battery in conformity with an auxiliary charging condition which does not cause a harmful effect on the non-compliant battery;

a control unit configured to receive the result from the identification unit, and, when the result shows the compliant battery, activate the main charging unit, and, when the result indicates the non-compliant battery, activate the auxiliary charging unit;

the auxiliary charging condition includes an unspecified battery charging condition for an unspecified battery which is not corresponding to any of plural specified batteries; and the unspecified battery charging condition indicates a charging current and a charging voltage which are selected such that any unspecified battery does not suffer from a harmful effect.

2. The charger as set forth in claim 1, wherein:

the charger further comprises a storage unit;

the storage unit is configured to store a plurality of the auxiliary charging conditions;

the plurality of the auxiliary charging conditions include plural specified battery charging conditions respectively corresponding to plural specified batteries included in the non-compliant battery and the unspecified battery charging condition;

the identification unit is configured to, in the identification process, upon concluding that the battery being connected to the connector is the non-compliant battery, further judge whether the battery is any one of the specified batteries or the unspecified battery different from the plural specified batteries; and the control unit is configured to:

when the result shows the specified battery, retrieve the specified battery charging condition corresponding to the specified battery shown by the result from the storage unit and control the auxiliary charging unit in conformity with the retrieved specified battery charging condition; and when the result shows the unspecified battery, retrieve the unspecified battery charging condition from the storage unit and control the auxiliary charging unit in conformity with the retrieved unspecified battery charging condition.

3. The charger as set forth in claim 2, wherein:

the auxiliary charging unit is configured to charge the non-compliant battery by supplying a constant current to the non-compliant battery;

the auxiliary charging condition indicates a value of the constant current; and the value of the constant current indicated by the unspecified battery charging condition is not greater than a minimum of the values of the constant currents indicated by the respective plural specified battery charging conditions.

4. The charger as set forth in claim 2, wherein:

the auxiliary charging unit is configured to charge the non-compliant battery by applying a constant voltage to the non-compliant battery;

the auxiliary charging condition indicates a value of the constant voltage; and the value of the constant voltage indicated by the unspecified battery charging condition is not greater than a minimum of the values of the constant voltages indicated by the respective plural specified battery charging conditions.

5. The charger as set forth in claim 2, wherein:

the charger comprises a voltage acquisition unit configured to acquire a value of a voltage of the battery being connected to the connector;

the control unit is configured to judge whether or not the value of the voltage acquired by the voltage acquisition unit is not less than a predetermined threshold, and, upon concluding that the value of the voltage acquired by the voltage acquisition unit is not less than the predetermined threshold, terminate an operation of the auxiliary charging unit; and the auxiliary charging condition indicates the predetermined threshold.

6. The charger as set forth in claim 1, wherein the identification unit includes:

an acquisition circuit configured to acquire type information representing a type of the battery in response to connection of the battery to the connector; and an identification circuit configured to perform the identification process based on the type information acquired by the acquisition circuit.

7. The charger as set forth in claim 6, wherein:

the connector includes two identification terminals for identifying the type of the battery;

the acquisition circuit is configured to measure a resistance between the two identification terminals; and the type information is defined as the resistance between the two identification terminals.

8. The charger as set forth in claim 6, wherein:

the connector includes a single identification terminal for identifying the type of the battery; and the acquisition circuit is configured to receive an identification signal indicative of the type information via the identification terminal.

9. A charging system comprising:

the charger according to claim 1; and an adapter, wherein the adapter comprises:

a first connector configured to allow the connector of the charger to be directly connected thereto;

a second connector configured to allow the non-compliant battery to be directly connected thereto;

a connection circuit interposed between the first connector and the second connector and electrically connecting the first and second connectors to each other; and an identification part having information indicative of the non-compliant battery allowed to be directly connected to the second connector.

* * * * *